Oct. 11, 1927.

C. W. HUMPHREY ET AL 1,645,144

APPARATUS FOR PURIFYING AND SOLIDIFYING ALUMINUM CHLORIDE

Original Filed May 31, 1923   3 Sheets-Sheet 1

Inventors.
Clifford W. Humphrey.
Donald S. McKittrick
by
James T. Barkelew
Attorney.

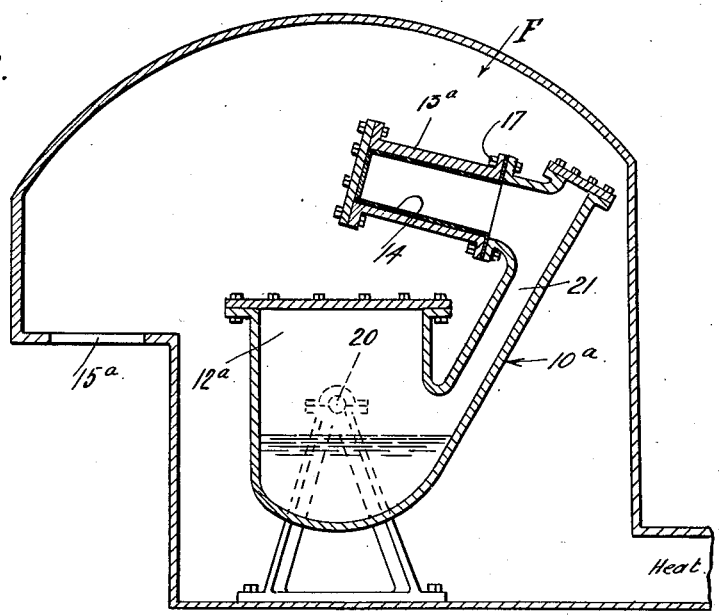
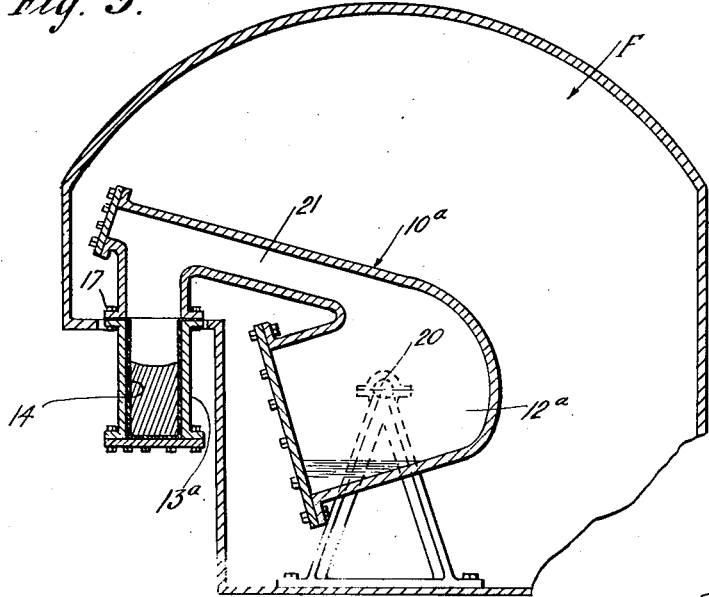

Oct. 11, 1927.  1,645,144
C. W. HUMPHREY ET AL
APPARATUS FOR PURIFYING AND SOLIDIFYING ALUMINUM CHLORIDE
Original Filed May 31, 1923    3 Sheets-Sheet 3

Inventors
Clifford W. Humphrey.
Donald S. McKittrick.
by
*[signature]*
Attorney

Patented Oct. 11, 1927.

1,645,144

UNITED STATES PATENT OFFICE.

CLIFFORD W. HUMPHREY, OF RED BANK, NEW JERSEY, AND DONALD S. McKITTRICK, OF OAKLAND, CALIFORNIA, ASSIGNORS TO SAID HUMPHREY AND HENRY I. LEA, OF SANTA MONICA, CALIFORNIA.

APPARATUS FOR PURIFYING AND SOLIDIFYING ALUMINUM CHLORIDE.

Application filed May 31, 1923, Serial No. 642,677. Renewed November 6, 1926.

This invention has to do with apparatus for purifying and solidifying aluminum chloride and similar substances.

In co-pending applications filed by us we have explained processes for solidifying and for purifying aluminum chloride and like substances, said applications being as follows:

Methods of purifying aluminum chloride, Serial No. 642,676, filed May, 31, 1923.

Processes of solidifying aluminum chloride, Serial No. 642,210, filed May 29, 1923.

We will here briefly explain the gist of such processes in order that the use of the apparatus herein set out and claimed may be fully understood. Aluminum chloride is one of those substances that ordinarily will, upon application of heat, pass directly from the solid to the vapor form; and upon cooling will condense directly from the vapor to the solid form, either in finely divided or crystalline state. Aluminum chloride in such forms is very prone to deterioration. On the other hand we have found that if aluminum chloride can be put into the form of a solid cake or block the deterioration is lessened to such an extent that by proper protection it will keep indefinitely.

Upon heating aluminum chloride under a sufficient pressure (for instance, its own vapor pressure in an enclosed chamber) a point of temperature and pressure is reached where the aluminum chloride will pass through the liquid stage in changing between the solid and vapor stages. Thus, in a diagram representing the temperature-pressure characteristic of aluminum chloride, a single line represents the temperature-pressure characteristic up to a point about 190° C., but at this point the line branches into two curves, one representing the temperature-pressure characteristic between the vapor and liquid states and the other representing the characteristic between the liquid and solid states. The point of branching of these two lines is denoted the "triple point". At any temperature below the triple point aluminum chloride will pass directly between the solid and vapor stages. At any temperature above the triple point aluminum chloride will pass through the liquid stage in passing between the solid and vapor stages.

We make use of this characteristic quality of aluminum chloride for the purpose of purifying and solidifying it. For instance, we heat the chloride in a bomb capable of withstanding the vapor pressure, carrying the temperature to a point above the triple point; and the chloride being thus held under its own vapor pressure at a temperature higher than the triple point, the body of the chloride is held in liquid state. In this liquid state we find it possible to carry on certain chemical reactions to purify the liquid if that is desired. For instance, if we desire to remove iron chloride impurities, we introduce into the bomb a sufficient amount of metallic aluminum to replace the iron of the iron chloride; and we find that by holding the aluminum chloride in liquid state, the aluminum will react, at that temperature, to replace the iron, the replaced iron being precipitated out of the molten mass and dropped to the bottom of the bomb. Then (and this is true whether a purified reaction has been carried on or not) by distilling over the vapors of the aluminum chloride, and cooling and condensing those vapors without correspondingly relieving the pressure on the body of liquid aluminum chloride, we can condense the aluminum chloride into liquid and further into a solid cake form. The lowering of temperature necessary to liquefy or solidify aluminum chloride is very little. For instance, if we are holding the body of liquid aluminum chloride at a temperature of 210° C. and at a corresponding vapor pressure of about 200 mm, it is only necessary to lower the temperature to about 200° C. in order to condense the vapors to liquid form, and only necessary to lower the temperature further to about 190° C. or a little less to solidify the aluminum chloride. But in practice, we usually bring the temperature down to about normal room temperature in effecting solidification.

With this preliminary understanding of the process, the structure and operation of the apparatus will be easily understood. The apparatus consists essentially of a bomb or other chambered structure capable of withstanding the pressures and also capable of withstanding the chemical action of the aluminum chloride. This bomb is to be considered as having two chambers that may be heated or cooled independently so that although the vapor pressure is nearly the same throughout the chambers (the chambers being in free communication with each other) the temperatures in the two chambers may be varied independently. Several typical and illustrative forms of apparatus are illustrated in the accompanying drawings in which:

Fig. 1 is a vertical section showing a simple form of apparatus;

Fig. 1ª is a diagram showing the position of the parts during one step of the process;

Fig. 1ᵇ is a similar diagram showing the position of the parts during the last step of the process;

Figs. 2 and 3 are vertical sections illustrating another form of apparatus in its two different positions;

Fig. 6 is a vertical section illustrating another form of apparatus.

Figure 4:
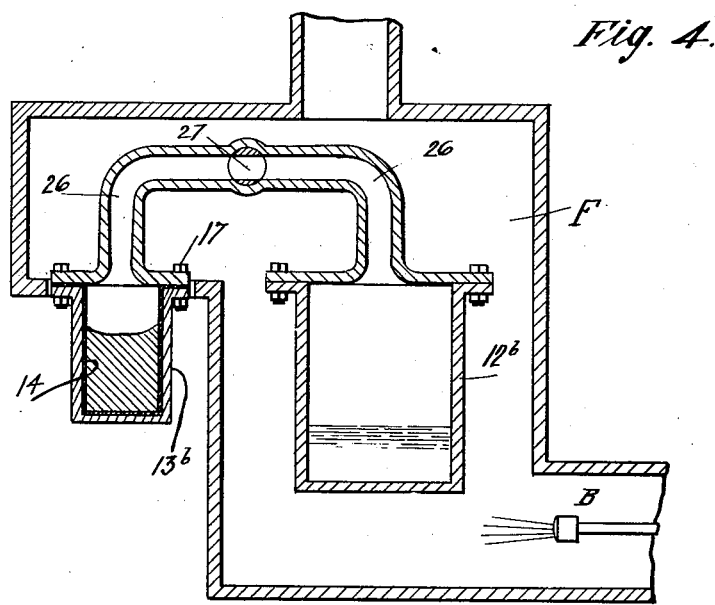
Fig. 4 is a vertical section illustrating another form of apparatus.

Referring first to Fig. 1 it will be seen that we have there a furnace F which may be heated by any suitable means as by a burner B; and in this furnace is located the bomb 10. This bomb 10 may be movably supported in any suitable manner as by a cradle 11 which supports the bomb at an angle as illustrated. The bomb is made in two parts or chambers 12 and 13 which may be secured together by suitable releasable fastenings 17 to facilitate charging of the bomb and removal of the solidified product. Chamber 12 is the charge receiving chamber and chamber 13 is the product receiving chamber; and this product receiving chamber 13 may have in it an inner container 14, say of sheet iron, to receive the solidified product, and which container may be afterwards sealed over its top to form a shipping receptacle. In this manner we easily and conveniently make a shipping package. The container 14 may be a mold of any shape into which the product is cast in any desired form, as in the form of sticks, brickets, etc. The molded product may be removed from such mold and placed in any desired shipping container.

The furnace F may conveniently have an opening at 15 with a suitable closure 16. When a charge of original aluminum chloride, or impure aluminum chloride, is first placed in chamber 12 the whole bomb is put into the furnace as illustrated in Figs. 1 and 1ª. The temperature is then brought up to something above 200° C. and the temperature maintained long enough to vaporize and liquefy the chloride, and also long enough to hold aluminum chloride in liquid form for a time period sufficient to allow chemical reaction to take place, if the chloride is being purified. This stage of the operation is illustrated in Fig. 1ª. The impurities drop to the bottom as illustrated. And it might be well here to state that even if a chemical purifying reaction is not used, any impurities that will not liquefy or volatilize at the temperatures employed, and which are heavier than the liquid chloride, will drop to the bottom.

Then, while the temperature is kept up in furnace F, the bomb is moved upwardly diagonally until chamber 13 projects more or less from the furnace, so that chamber 13 may cool. The vapors in chamber 13 are thus subjected to a cooling action, but without disturbing the temperature or greatly changing the pressure established in chamber 12 on the body of liquid aluminum chloride. The vapors, thus maintained under nearly the same pressure, but in chamber 13 at a lower temperature, cool through the liquid state into the solid state and a mass of solid chloride is deposited in chamber 13. This action is kept up until all of the chloride in chamber 12 has been vaporized and all the vapor has been distilled over into chamber 13 and deposited there in solid form. Then the chamber 13 is removed and the cake of aluminum chloride sealed in the container 14.

In Figs. 2 and 3 we illustrate a form of device in which a bomb 10ª is supported in a furnace F on a pivot trunnion 20. Chamber 12 of the bomb has a neck 21 that communicates with the receiving chamber 13ª of the bomb, this receiving chamber 13ª having in it the inner container 14 as before and being connected with the neck by releasable fastenings 17. The furnace has an opening 15ª through which receiving chamber 13ª may be moved out of the furnace for cooling. In the position of the bomb during the first stage of the operations the chamber 13ª stands above chamber 12ª in an inclined position, and the neck 21 is also inclined downwardly to chamber 12ª, so that there is no liability of vapor condensation in chamber 13ª or neck 21 during the first stage of operations. Then, during the second stage of operations, when the chloride is condensed and solidified, the bomb is moved to the position shown in Fig. 3, the chamber 13ª being thus cooled and the chloride thus condensed in solid form in the container 14. In this form of apparatus the position of receiving chamber 13ª during the first stage of the operations, as shown in Fig. 2, prevents condensation in that chamber during that procedure, and the relative position of chamber 13ª in the last stage of the operations prevents any condensate from passing back to chamber 12ª. In the form of Fig. 1 the inclination of the bomb as a whole prevents any vapor condensing or remaining in the chamber 13 during the first stage of operations. The inclination of the bomb in Fig. 1 is sufficient to raise the receiving chamber 13 high enough above charge chamber 12 so that the solid condensate is well above the liquid in chamber 12 and well separated from the impurities; but the inclination is not so great that the deposited solid will slide down to the lower end of the bomb.

In Fig. 4 we show another form in which the charge receiving chamber 12$^b$ is connected by passage 26 with the product receiving chamber 13$^b$, a valve 27 being placed in passage 26. Here the product receiving chamber 13$^b$ is permanently outside furnace F. During the first stage of the operations valve 27 is closed; but when the chloride has been raised to the proper temperature and pressure and has all been liquefied, and purified if desired, then valve 27 is opened and the vapors are distilled over into chamber 13$^b$ and container 14, under the same pressure as before maintained (the temperature in the furnace being maintained throughout the operations); and the vapor is condensed through the liquid to the solid form in container 14.

Figure 5:
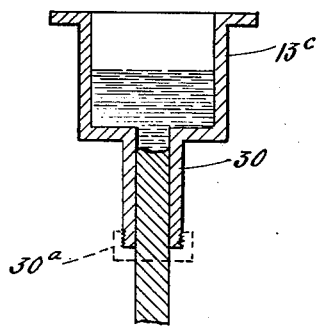
Fig. 5 is a detail section illustrating a modification applicable to any of the forms of apparatus herein described.

A modification applicable to any of the forms of apparatus herein described is shown in Fig. 5. Here we show a receiving chamber 13$^c$ that may take the place of the other product receiving chambers. This receiving chamber 13$^c$ has at its lower end a tube 30 through which a core of the solidified chloride may be forced by the vapor pressure. At the beginning of the operation the lower end of the tube 30 may be closed with a cap 30$^a$. When the tube has become filled with solidified chloride, the cap is taken off; and then the solid core of chloride is gradually forced out through the tube as the chloride condenses and solidifies above; the length of the tube and the friction of the core of solidified chloride therein being regulated so that the pressure will force the solidified chloride out as fast as it is formed. In this form of apparatus the temperature in chamber 13$^c$ proper is regulated by placing this chamber in a position extending more or less outside the furnace so that the temperature in the chamber is lowered just enough to liquefy the chloride. Then, the tube 30 projecting further beyond the furnace, the temperature there is low enough so that the chloride solidifies in the tube.

In Fig. 6 we show another form of apparatus in which the charge receiving chamber 12$^d$ of the bomb is located in one furnace F$^1$ while the condensate receiving chamber 13$^d$ is located in another furnace F$^2$, these two furnaces being heated by separate means, as indicated at B$^1$ and B$^2$, and therefore being maintainable at different temperatures. In the operation of this form of apparatus, after the proper charge has been put into chamber 12$^d$, then furnace F$^1$ and chamber 12$^d$ are brought to a temperature of say 250° to 275° C.; and at the same time, or a little before, furnace F$^2$ and chamber 13$^d$ are brought to a temperature of, say, somewhat over 350°. (These temperatures are all approximate.) This will prevent condensation of chloride vapors in chamber 13$^d$ during the step of volatilization, liquefaction and reaction. When the reaction is completed— when the metallic aluminum has displaced all the iron in the ferric chloride—or when the liquefaction of the chloride has been completed, the temperature in furnace F$^2$ is lowered to somewhat below the temperature of furnace F$^1$, so that the purified chloride will vaporize over into chamber 13$^d$ and condense there in liquid form; and then when the temperature of chamber 13$^d$ is further lowered the liquid will solidify. By first bringing the temperature of chamber 13$^d$ down to something below that of chamber 12$^d$, but above the temperature of the triple point, distillation into chamber 13$^d$ and condensation first in the liquid state is assured. During the liquid condensation period the temperature in 12$^d$ may be raised to say 350° C. so as to prevent any possibility of crystallization in the connecting tube. Then, during the solidification step, when chamber 13$^d$ is brought down to below the melting point (usually in practice to the normal room temperature or thereabouts) the temperature in chamber 12$^d$ may be maintained at about its original temperature of say 250° C. All the temperatures here given are approximate. The limiting temperatures may be noted by a study of the diagram of Fig. 7. It will be seen that the methods we have now described involve, preferably, the heating of aluminum chloride to such a temperature and under such a pressure as will cause the body of the aluminum chloride to be held in liquid state. Then we have explained how we may distill over the vapors, and by slightly cooling those vapors cause a body of liquid condensate to be formed, which liquid condensate afterwards further cools and solidifies. Now this second formed body of liquid is also held in liquid state by the vapor pressure. Consequently, one aspect of our process is the holding of a body of aluminum chloride or the like in liquid state by the proper application of temperature and pressure, and solidification from the liquid state. Now, instead of solidifying from a liquid body that has been formed by condensation from vapors, we may solidify directly from the original liquid body, holding that liquid body under the requisite pressure to keep it in liquid state, while cooling it slightly will cause it to go in solid state. This particular procedure may be effectively used where we desire only to solidify aluminum chloride or the like. Where it is desired to purify at the same time, it is preferable to form the body of liquid by distillation.

The various forms of bombs may be made wholly of some reaction resisting material, as glass, fused silica, porcelain, etc. or, as we prefer, may be made of some suitable metal, lined with a reaction resisting material, as porcelain, enamel, for instance.

It will be understood that we have not attempted in this specification and the accompanying drawings to in any manner exhaust the various modified forms of apparatus that may be used in carrying out the described processes; but the forms that have been illustrated and described will be sufficient to explain our invention, so far as it appertains to the apparatus, to those skilled in the art.

Having described a preferred form of our invention, we claim:—

1. Apparatus for a process of the kind herein described, comprising in combination a furnace, a retort of two chambers, one chamber located within the furnace and the other chamber adapted to be placed within the furnace or extended to a position beyond the furnace, so that both chambers may be heated or one chamber may be heated while the other is relatively cooled.

2. Apparatus for a process of the kind herein described, comprising in combination a furnace, a retort of two chambers, one chamber located within the furnace and the other chamber adapted to be placed within the furnace or extended to a position beyond the furnace, so that both chambers may be heated or one chamber may be heated while the other is relatively cooled; the two chambers being in communication with each other and the communication, when the retort is in position with the product receiving chamber outside the furnace, extending upwardly from the charge receiving chamber and then downwardly to the product receiving chamber.

3. Apparatus for a process of the kind herein described, comprising in combination a closed furnace, a closed retort of two chambers, one chamber located within the furnace and the other chamber adapted to be extended to a position beyond the furnace, so that one chamber may be heated while the other is relatively cooled; and a cooled tubular outlet for the cooled chamber.

4. Apparatus for a process of the kind herein described, comprising a product receiving chamber and a communicating member to which the chamber is removably secured, and a removable inner container within the chamber adapted when removed to form a shipping package for the received product.

In witness that we claim the foregoing we have hereunto subscribed our names this 14th day of May, 1923.

CLIFFORD W. HUMPHREY.
DONALD S. McKITTRICK.